United States Patent [19]

Stenkvist

[11] 3,997,712
[45] Dec. 14, 1976

[54] ELECTRIC ARC FURNACE
[75] Inventor: Sven-Einar Stenkvist, Vasteras, Sweden
[73] Assignee: Allmanna Svenska Elektriska Aktiebolaget, Vasteras, Sweden
[22] Filed: June 17, 1975
[21] Appl. No.: 587,714
[30] Foreign Application Priority Data
June 19, 1974 Sweden ............................. 7408067
Dec. 19, 1974 Sweden ............................. 7416094
[52] U.S. Cl. ................................................. 13/9
[51] Int. Cl.$^2$ ......................................... H05B 7/00
[58] Field of Search .................. 13/1, 9, 10, 12, 14, 13/15, 16, 17, 18, 11

[56] References Cited
UNITED STATES PATENTS
2,958,719  11/1960  Beecher ............................. 13/10 X
3,789,127  1/1974  Bowman ............................ 13/10 X FOREIGN PATENTS OR APPLICATIONS
2,168,430  1/1973  France ................................. 13/10

Primary Examiner—R. N. Envall, Jr.
Attorney, Agent, or Firm—Kenyon & Kenyon Reilly Carr & Chapin

[57] ABSTRACT

An electric arc furnace for DC operation has an electric connection for a melt in the furnace's hearth, in the form of an elongated metal connector having a refractory enclosure exposing an inner end of the connector for contact with and incidental melting by the melt, with means for cooling the connector between its inner and outer ends and removing heat at a rate preventing the connector from melting throughout its length to its outer end. The connector has a cross-sectional area large enough to carry the current required for forming a heating arc between an electrode and the surface of the melt, and the connector has similar composition as the melt as exemplified by a steel connector for a steel melt.

8 Claims, 4 Drawing Figures

ELECTRIC ARC FURNACE

BACKGROUND OF THE INVENTION

An arc furnace for use with direct current requires an electric connection with the melt in the furnace's hearth to provide the circuit required for an arc or arcs formed between the melt and one or more electrodes having lower ends spaced above the melt's surface.

A hearth made of conventional refractory is electrically non-conductive and requires one or more electrical connectors to be projected through the hearth to contact the melt in the hearth. Without water cooling such a connector has an undesirable short service life. Water cooling has been avoided as much as possible because it is considered to be dangerous if used close enough to the inner end of the connector to have any practical effect. For example, if during the operation of a furnace the melt burns through the hearth and reaches water, an explosion may result. A cathodic graphite arcing electrode has better operating and service life characteristics then one operated as an anode. If the arcing circuit is completed by using two arcs with the circuit closed by the melt via the arcs, one electrode must operate as an anode, which is undesirable.

SUMMARY OF THE INVENTION

According to the present invention, DC electric arc furnace may use a conventional hearth and one or more conventional arcing electrodes all operating as cathodes. For the electrical connection with the melt in the hearth, one or more elongated metal connectors are used, each having a refractory enclosure exposing the inner end of the connector for direct contact with and incidental melting by a melt in the hearth of the furnace, the outer end or ends being externally exposed for electrical connection with the circuit powering the furnace, the connector and the melt forming the anode. At a position safely remote from the inside of the hearth and between the inner and outer ends of the connector, cooling means are provided for cooling the connector between its inner and outer ends at a rate removing the melt heat therefrom at a rate preventing the connector from melting throughout its length to its outer end where the electrical connection is made. In other words, the connector is deliberately permitted to melt at its inner end connecting with the furnace melt but is, in effect, solidified, or kept solid, through a zone safely ahead of the connector's outer end. Through the outer end portion of the connector, the cooling effect can proceed vigorously but safely.

By making the connector of metal having a similar composition as the melt in the furnace, no undesirable metallurgical effects are involved; in the case of a steel melt, a steel electrode is used, for example. The cross-sectional area of the electrode can be made great enought to carry the current required by the arc; in the case of a steel furnace the connector is in the form of a steel bar. The cross-sectional area of the connector or bar can be reduced, of course, if more than one is used.

For convenience, and to avoid possible concern about molten metal escaping between the interfaces of the connector and its refractory enclosure, such as might be hypothetically possible if the furnace is initially charged with molten metal prior to the connector's operating conditions stabilizing, the connector can be curved upwardly from its inner to its outer end so that its outer end is not substantially lower than the level of the melt in the furnace hearth. Such positive protection is not absolutely essential because with the water cooling in operation, such possible intersurface creepage of the melt should be solidified quickly, but some upwardly curvature is considered desirable in any event, because, if for no other reason, it permits the overall vertical extent of a furnace using this invention to be kept substantially within conventional limits.

An AC furnace using a channel-type inductor having its channel communicating with the hearth but with the inductor made removable from the furnace for servicing and repair, has practical advantages. The inductor with its channel formed by refractory can be removably connected to the furnace using a composition between the necessary mating refractory parts, preventing the inductor from fusing in position during operation of the furnace, facilitating removal of the inductory when desired. An example of what is meant here is provided by the U.S. Rydinger et al U.S. Pat. No. 3,249,676, issued May 3, 1966.

To enjoy the removability feature indicated above, the present invention may be made in the form of a unit formed by the refractory enclosure of the connector and which connects with a side of the furnace hearth via a passage to the hearth, the refractory enclosure then receiving a portion of the melt with the inner end of the connector of connectors exposed to this portion. This unit, like the inductor described, can also in a corresponding way be made removable from the furnace for servicing.

BRIEF DESCRIPTION OF THE DRAWINGS

The accompanying drawings schematically illustrate various examples of the present invention, the various figures being as follows.

DETAILED DESCRIPTION OF THE INVENTION

Figure 1:
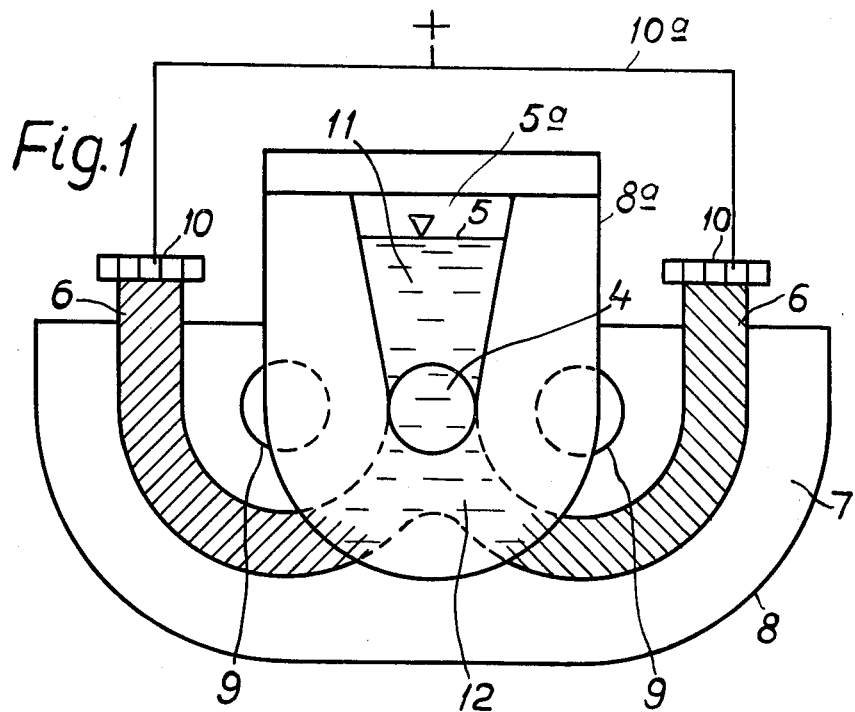
FIG. 1 is a vertical transverse section through a removable unit of the character referred to hereinabove.
Figure 2:
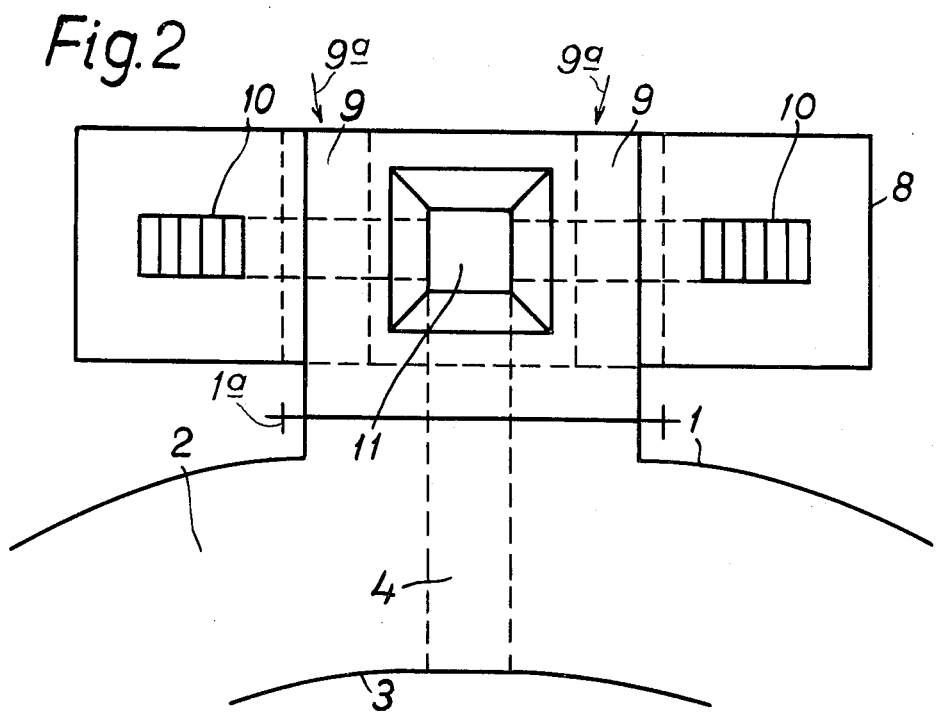
FIG. 2 is a top plan view of the unit of FIG. 1 and shows a portion of the furnace hearth with its opening required for the furnace melt to communicate with the unit.

Having reference to FIGS. 1 and 2, only a portion of the furnace hearth is shown because, excepting for the features of this invention, the construction may be generally conventional. Thus, the usual outer steel furnace shell is shown at 1 with the hearth lining 2 which may be made from rammed magnesite compound and/or brick, thus being electrically non-conductive. The hearth has the substantially horizontally extending opening or channel 4 through which a melt can flow when it is poured into the hearth. If the furnace charge is initially solid pieces, a starting electrode may be used to contact the pieces to form a melt sufficient to run through the opening or channel 4, after which the starting electrode can be removed.

The unit removable attached to the side of the hearth 1 by releasable means generally indicated at 1a, provides for the formation of a pool of the molten melt 5 which, via the opening or channel 4 which is below the furnace melt level, rises to that level to provide a melt for contact by the inner ends of the two connectors 6 which curve upwardly so that their upper ends are somewheres near that level. Each of the connectors 6 is enclosed by the refractory enclosure 7 formed by this unit, the refractory being supported by a steel shell 8, water-cooling jackets 9 being nested within the curves of the connector 6, and water cooling channels on the outside surface of the steel casing for the heat removal previously referred to. A substantial thickness of the refractory 7 separates these colling passages 9 from the molten metal.

Figure 3:
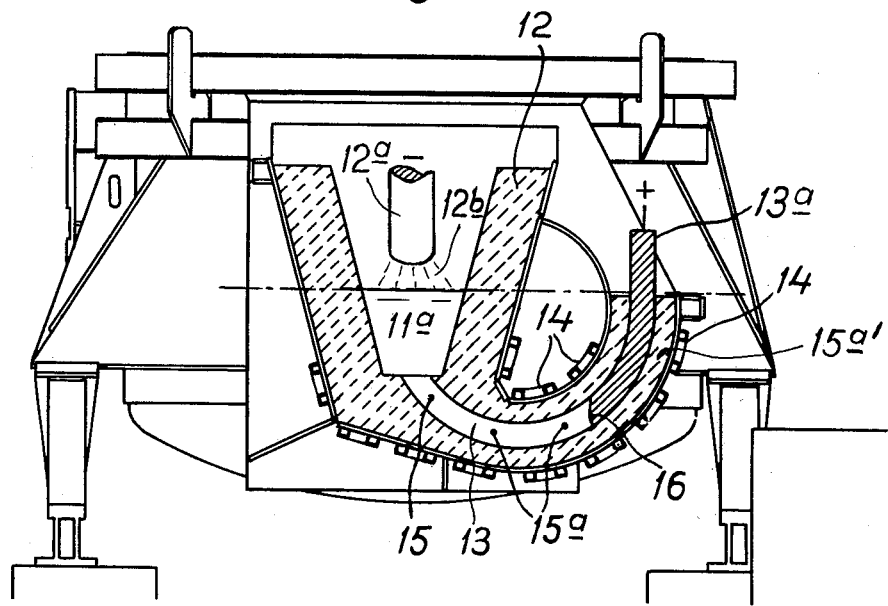
FIG. 3 is a partial vertical section through a furnace showing an example of the invention when it is integrated with the furnace construction.

The connectors 6 may be made from ordinary steel bar stock in the case of a steel furnace, and the outer ends of the connectors may have means 10 for connection with the positive side of the furnace power circuit, indicated only generally at 10a. Although not shown, it is to be understood that the hearth's inside 3 will, in operation of the furnace, contain a melt which runs through the channel to form the pool 11, and that at least one arcing electrode is porivded, as indicated by FIG. 3, for example, with the electrode or electrodes being connected to the negative side of the circuit 10a so they operate as cathodic electrodes. Cooling water will be supplied to the cooling passages 9 as indicated by the arrows 9a.

The operation of the new anodic connection to the melt in the inside 3 of the hearth, assuming the hearth contains a melt and that the arcing electrode (not shown) is operating, is substantially as follows.

The inner ends of the two connectors or bars 6 cannot be consumed or burnt away because they merge, in effect, with the pool 5 of the molten melt passed through the opening or channel 4 from the melt on the inside 3 of the hearth of the furnace. The two connectors 6, or the two steel bars as referred to hereinabove, assuming that the melt is steel, have their forward ends molten and joining with the melt. Backwardly from the forward ends of the two connectors, the water cooling generally indicated at 9a, prevents the melt heat from traversing outwardly very much farther, the heat being abstracted by the water cooling 9a and at the surface 8. Thus, there is a zone in the area indicated at 12, where the adjacent ends of the two connectors 6 are represented by molten metal, the molten metal gradually merging into solidified metal, due to the cooling via 9a and at the surface 8, so that the outward balance of the two connectors or bars remains solid metal, permitting the connections at 10 with the circuit 10a. Of course, the connections 10 may be themselves cooled, although this is not shown. Because the two connectors or bars 6 curve from their merging points in the area 12, upwardly therefrom to their upward ends at the connections 10, and assuming cooling is established through the channels or ducts 9, initial pouring of a molten charge into the hearth of the furnace, does not result in any of the molten metal running very much outwardly through the interfaces between the connectors 6 and their refractory enclosures 7. In this connection, it is to be understood that with the steel shell 8 in use, the curved bar connectors 6, during manufacture of the unit under discussion, can be positioned along with the water-cooled channels very schematically illustrated at 9, and with any good refractory material, obviously electrically non-conductive, rammed into place within the steel shell 8, and within the upwardly extending portion 8a of this shell, together with the use of a suitable core, the unit shown by FIGS. 1 and 2 may be made. The necessary water cooling, schematically illustrated at 9 and at 8, would, of course, be formed normally by possible a relatively large number of metal cooling pipes positioned outside the refractory of the unit, this not being shown in detail because conventional techniques may be used other than that the water cooling pipes can be and should be kept remote from close approach to the molten metal. This possibility of keeping the water cooling remote from the pool 11, and, therefore, of course, remote from the melt in the furnace hearth, permits the use of water cooling in a manner so safe as to be free from the normal objections to water-cooled connectors or electrodes, such as would otherwise be used to connect with the melt in a direct current electirc arc furnace using only cathodic arcing electrodes.

Figure 4:
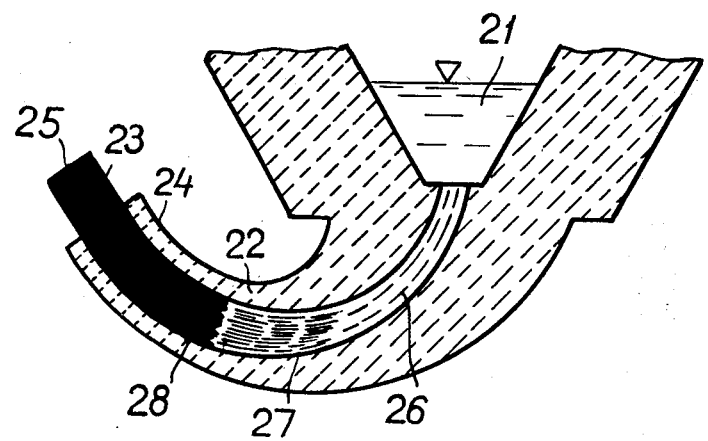
FIG. 4 shows a modification of FIG. 3.

The invention as shown by FIGS. 3 and 4 does not involve the concept of the removable unit arrangement of FIGS. 1 and 2. In this case, the connector or electrode 13 is encased by refractory material, which may represent a part of the furnace hearth refractory indicated at 12, the cathodic electrode 12a forming the arc 12b directly between the melt 11a; which, as shown at 15, extends through the upwardly curved refractory enclosure or lining 15a of the furnace hearth itself. In this case there is only one connector shown its outer end 13a being connected to the positive side of the furnace powering circuit. Although shown with its refractory enclosure 15 being, in effect, part of the hearth and/or lining 12 of the furnace, it could be an offset separable unit as described in the case of the FIGS. 1 and 2 form.

In this case, the water cooling is provided by external water-cooling channels 14 which may be an extension of those commonly used on the outside steel shell of almost any type of arc furnace. However, they should be arranged so that with the inner end of the connector molten as at 15, there is a liquidous-solidous range 15a beyond the inner end of the connector and which terminates, as at 16, where the partially solidifed molten metal has converted completely to its solid phase, the balance of the water cooling from and into the outer end 13 of the connector serving to keep the outer end from being excessively hot, considering the requirements for normal mechanically-applied electrical attachments.

With the present invention, using one or more of the solid steel bars or connectors with their inner ends directly exposed on the inside of the furnace hearth, the balance of the hearth being formed by refractory having relatively low thermal conductivity as compared to the steel connector, there is the risk that when a melt is initially poured into the hearth, of a furnace embodying the present invention, that a bottom boil might be formed. Correspondingly, the same risk might be involved if the heat abstracted from the connector or steel bar by the described cooling required to provide the connector with a solid outer portion, removes heat from the melt at too rapid a rate.

With the above in mind, as shown by FIG. 4, the connector or electrode of the present invention indicated at 23 in this instance, as encased by the refractory enclosure or encasement 24, may be reduced in cross-section area from its outer end 25 towards its inner end where it is in its molten phase as indicated at 26, 23 indicating either the pool 5 of FIG. 1 or the main melt 11a as shown by FIG. 3. In FIG. 4 the liquid phase of the connector or bar is shown at 26, the solid phase at 28 and the transition phase at 27, 22 indicating the point of cooling.

The minimum cross-sectional area of the connector of FIG. 4, as at its innermost end, should be adequate to carry the current required for the electrode arc, but this can be at the expense of substantial electric-resistance heating of the inner end, thus reducing or eliminating any temperature difference between the connectors inner end and the melt shown at 21. For example, the ratio between the inner end of the connector 23 and its outer end 25 may be in the range of about from 1:2 to 1:3.

A smaller cross-sectional area is made possible by constructing the billet according to FIG. 4, i.e. by making the part of the billet which faces the melt—whether this part is molten or unmolten—smaller than the area at the contact 25. The steel billet is thus formed so that it has a smaller cross-sectional area at the end which makes contact with the melt than at the outer connecting end 25. The transition from small to large area should preferably be soft, and takes place suitably 500 mm from the end of the hearth connection and from the end part of the channel for the billet 23, close to the melt 21. When current passes through, the connecting end 25 will here be cold, because of the low resistance at this part of the billet, and the losses for the hearth connection on the whole will be low. The heat losses will be higher at the hearth connection end which is thus kept warm, whereas the outer connecting end 25 is still cold and has low losses, as mentioned.

Referring now back to the form shown by FIGS. 1 and 2, it is to be noted that the upward portion 8a provides room for the formation of a space 5a above the level of the melt portion 5. This space permits the level of the portion 5 to rise and fall as required to accommodate expansion and contraction of the portion or pool 5.

What is claimed is:

1. An electric arc furnace comprising a hearth having an inside and outside for containing a melt on its inside, an electrode positioned to form an arc between the electrode and a melt in the hearth when the electrode and melt have connections with an electric power source, an electric melt connection comprising at least one elongated metal connector having inner and outer ends and a refractory enclosure exposing the inner end for contact with and melting by a melt in said hearth, and cooling means for cooling the connector at least between its inner and outer ends for removing heat therefrom at a rate preventing the connector from melting throughout its length to its outer end, said connector being curved upwardly from its inner end to its outer end so that its outer end is not substantially lower than the level of a melt when contained by said hearth while its inner end is substantially below said level.

2. The furnace of claim 1 in which said refractory enclosure is a unit on the outside of said hearth and is connected to the outside, the hearth having an opening for connecting the connector's inner end with a melt in the hearth.

3. The furnace of claim 2 in which said refractory enclosure forms an expansion chamber for containing via said opening a portion of a melt in said hearth with room for expansion and contraction of this portion.

4. The furnace of claim 2 in which said unit has means for removably connecting it to the hearth's outside.

5. The furnace of claim 2 in which said connector is formed by a plurality of said connectors with each enclosed by said refractory enclosure forming said unit for all of the connectors, the inner ends of the connectors being positioned adjacent to each other at said opening of the hearth so they are cooperative.

6. An electric arc furnace comprising a hearth having an inside and outside for containing a melt on its inside, an electrode positioned to form an arc between the electrode and a melt in the hearth when the electrode and melt have connections with an electric power source, an electric melt connection comprising at least one elongated metal connector having inner and outer ends and a refractory enclosure exposing the inner end for contact with and melting by a melt in said hearth, and cooling means for cooling the connector at least between its inner and outer ends for removing heat therefrom at a rate preventing the connector from melting throughout its length to its outer end, said refractory enclosure comprising a unit on the outside of the hearth and connected to said outside, the hearth having an opening for connecting the connector's inner end with a melt in the hearth.

7. The furnace of claim 6 in which said cooling means is for water cooling the connector and forms a part of said unit.

8. The furnace of claim 7 in which said unit is connected to said outside of the hearth by releasable means so the unit is removable from said outside.

* * * * *